(12) United States Patent
Crockett

(10) Patent No.: US 10,555,459 B1
(45) Date of Patent: Feb. 11, 2020

(54) ADJUSTABLE SHIELD FOR A STRING TRIMMER

(71) Applicant: Benny Crockett, Commerce, TX (US)

(72) Inventor: Benny Crockett, Commerce, TX (US)

( * ) Notice: Subject to any disclaimer, the term of this patent is extended or adjusted under 35 U.S.C. 154(b) by 0 days.

(21) Appl. No.: 16/247,686

(22) Filed: Jan. 15, 2019

(51) Int. Cl.
*A01D 34/416* (2006.01)

(52) U.S. Cl.
CPC ....... *A01D 34/4167* (2013.01); *A01D 34/416* (2013.01)

(58) Field of Classification Search
CPC .................. A01D 34/4167; A01D 34/416
See application file for complete search history.

(56) References Cited

U.S. PATENT DOCUMENTS

| | | | | |
|---|---|---|---|---|
| 4,803,831 A * | 2/1989 | Carmine | ............. | A01D 34/416 56/16.9 |
| 5,010,720 A * | 4/1991 | Corsi | ................ | A01D 34/4167 56/320.1 |
| 5,048,187 A * | 9/1991 | Ryan | .................. | A01D 34/4167 30/276 |
| D382,780 S | 8/1997 | Meisner | | |
| 5,768,786 A * | 6/1998 | Kane | ...................... | A01D 34/90 188/77 W |
| 5,950,317 A | 9/1999 | Yates | | |
| 5,996,234 A * | 12/1999 | Fowler | ................... | A01D 34/90 30/276 |
| 6,226,876 B1 | 5/2001 | Ezell | | |
| 6,779,324 B2 | 8/2004 | Hanes | | |
| 6,842,985 B2 | 1/2005 | Richardson | | |
| 6,997,268 B2 * | 2/2006 | Smith | .................. | A01D 34/416 172/123 |
| 8,720,071 B2 * | 5/2014 | Galinski | ............ | A01D 34/4163 30/276 |
| 9,433,146 B2 | 9/2016 | Hutchins | | |
| 9,854,738 B2 | 1/2018 | Miller | | |
| 2008/0189958 A1 | 8/2008 | Hurley | | |
| 2015/0173293 A1 * | 6/2015 | Hutchins | ............ | A01D 34/4167 30/276 |

* cited by examiner

*Primary Examiner* — Hwei-Siu C Payer

(57) ABSTRACT

The adjustable shield for a string trimmer is configured for use with a line trimmer. The adjustable shield for a string trimmer attaches to the line trimmer. The adjustable shield for a string trimmer comprises the line trimmer and a supplemental guard. The supplemental guard attaches to the line trimmer. The supplemental guard adjusts the arc of the working range of the cutting line of the line trimmer.

18 Claims, 9 Drawing Sheets

ADJUSTABLE SHIELD FOR A STRING TRIMMER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of agriculture, harvesting, and mowing, more specifically, a protection device for a flexible line cutter.

The line trimmer 101 is a device for cutting grass. The line trimmer 101 is traditionally used for trimming the edges of a landscaped space. The line trimmer 101 comprises a cutting line 111, a rotating head 112, a primary guard disk 113, and an extension shaft 114. The cutting line 111 attaches to the rotating head 112. The cutting line 111 is a cord. The rotating head 112 rotates such that the centripetal forces extend the cutting line 111 such that the cutting line 111 becomes a cutting edge that cuts the grass. The cutting line 111 is contained within the primary disk guard. The primary disk guard is a guard structure that limits the arc of the working range 181 of the cutting line 111 such that the cutting line 111 will not cause inadvertently damage. The extension shaft 114 is a handle that forms an extension structure that allows the line trimmer 101 to be conveniently manipulated. The extension shaft 114 is formed from a pipe.

The primary guard disk 113 is a hollow disk-shaped structure. The primary guard disk 113 has a semicircular disk structure. The primary guard disk 113 encloses half of the arc of rotation of the cutting line 111 such that the arc of the working range 181 of the cutting line 111 is 180 degrees. The primary guard disk 113 further comprises a primary open inferior face 131, a primary closed superior face 132, and a primary lateral face 133, an open primary vertical face 134 and a closed primary vertical face 135.

The primary open inferior face 131 is the face of the disk structure of the primary guard disk 113 that is proximal to the ground. The primary open inferior face 131 is an open face. The primary closed superior face 132 is the face of the disk structure of the primary guard disk 113 that is distal from the primary open inferior face 131. The primary closed superior face 132 forms a barrier that prevents the cutting line 111 from moving in the superior direction.

The primary lateral face 133 is the lateral face of the disk structure of the primary guard disk 113 that is perpendicular to the primary open inferior face 131 and the primary closed superior face 132. The open primary vertical face 134 is that lateral face of the semicircular disk structure of the primary guard disk 113 that passes through the center of the circle that forms the semicircular disk structure. The open primary vertical face 134 forms the opening for the cutting line 111 that creates the arc of the working range 181 of the cutting line 111.

The closed primary vertical face 135 is that lateral face of the semicircular disk structure of the primary guard disk 113 that aligns with the circumference of the semicircular disk structure of the primary guard disk 113. The closed primary vertical face 135 contains the cutting line 111 within the primary guard disk 113 when the cutting line 111 is not located within the arc of the working range 181 of the cutting line 111.

One of the shortcomings of the line trimmer 101 is that the angle of attack required for many grass cutting scenarios requires an arc of the working range 181 of the cutting line 111 that is significantly less than 180 degrees. In many situations, such a broad arc presents unnecessary dangers while the line trimmer 101 is in use.

Clearly, a method to adjust the arc of the working range 181 of the cutting line 111 of a line trimmer 101 would be of benefit.

SUMMARY OF INVENTION

The adjustable shield for a string trimmer addresses the above-described shortcoming of a line trimmer. The adjustable shield for a string trimmer is configured for use with a line trimmer. The adjustable shield for a string trimmer attaches to the line trimmer. The adjustable shield for a string trimmer comprises the line trimmer and a supplemental guard. The supplemental guard attaches to the line trimmer. The supplemental guard adjusts the arc of the working range of the cutting line of the line trimmer.

These together with additional objects, features and advantages of the adjustable shield for a string trimmer will be readily apparent to those of ordinary skill in the art upon reading the following detailed description of the presently preferred, but nonetheless illustrative, embodiments when taken in conjunction with the accompanying drawings.

In this respect, before explaining the current embodiments of the adjustable shield for a string trimmer in detail, it is to be understood that the adjustable shield for a string trimmer is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the adjustable shield for a string trimmer.

It is therefore important that the claims be regarded as including such equivalent construction insofar as they do not depart from the spirit and scope of the adjustable shield for a string trimmer. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
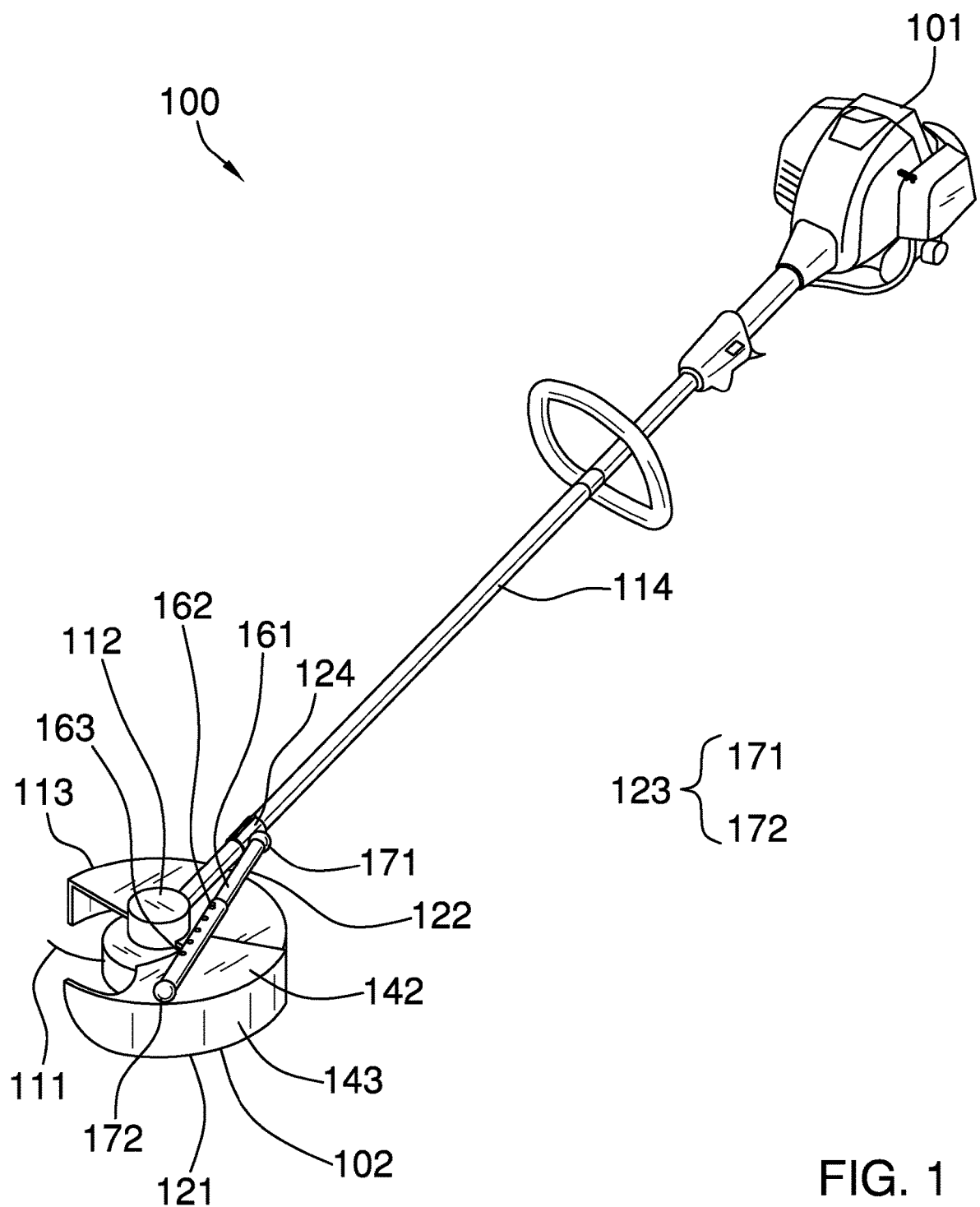
FIG. 1 is a perspective view of an embodiment of the disclosure.
Figure 2:
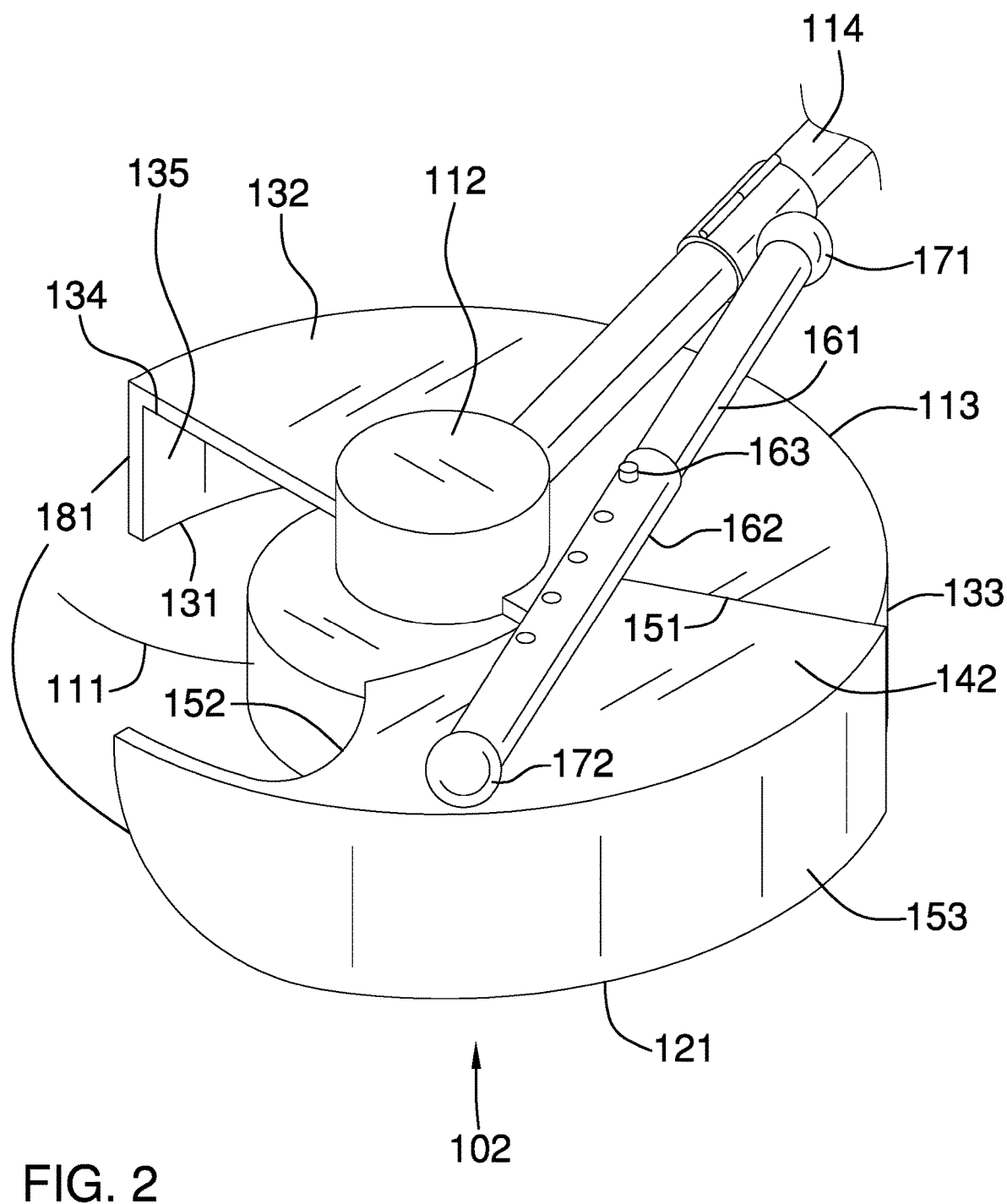
FIG. 2 is a perspective view of an embodiment of the disclosure.
Figure 3:
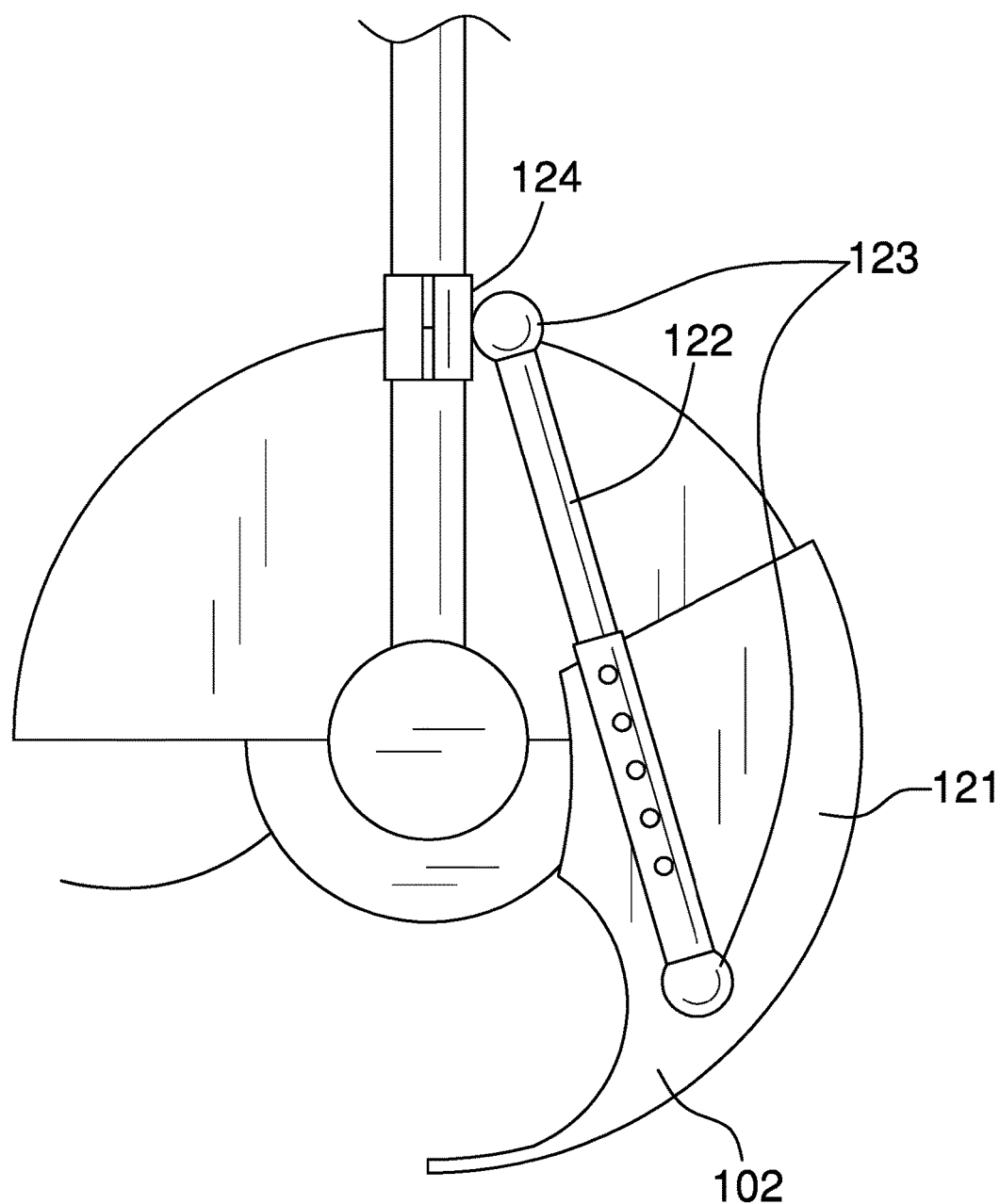
FIG. 3 is a top view of an embodiment of the disclosure.
Figure 4:
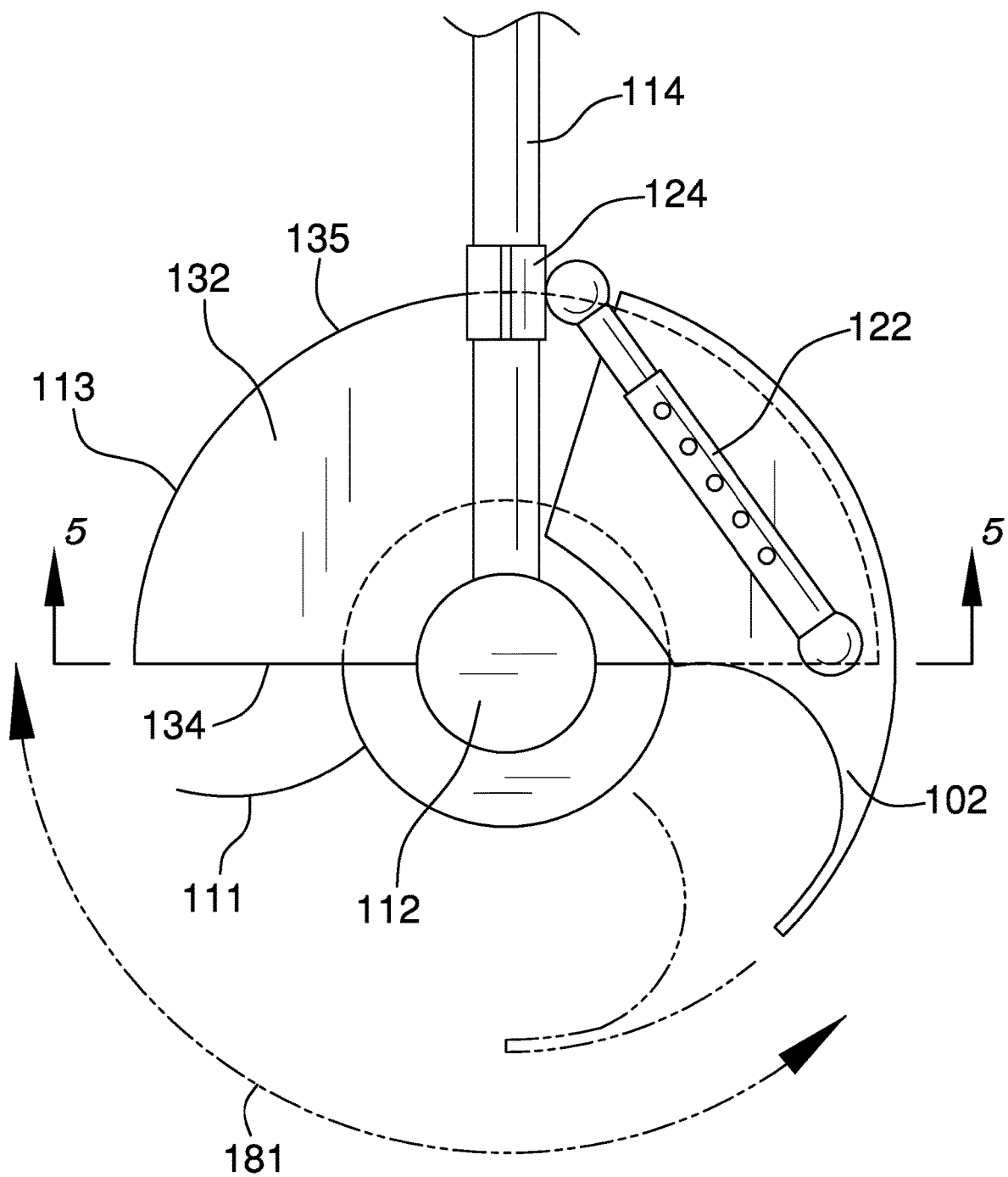
FIG. 4 is a top view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 9.

The adjustable shield for a string trimmer 100 (hereinafter invention) adjusts the arc of the working range 181 of the cutting line 111 of the line trimmer 101. The invention 100 is configured for use with a line trimmer 101. The invention 100 attaches to the line trimmer 101. The invention 100 comprises the line trimmer 101 and a supplemental guard 102. The supplemental guard 102 attaches to the line trimmer 101. The supplemental guard 102 adjusts the arc of the working range 181 of the cutting line 111 of the line trimmer 101.

The line trimmer 101 comprises a cutting line 111, a rotating head 112, a primary guard disk 113, and an extension shaft 114. The line trimmer 101 is described in greater detail elsewhere in this disclosure.

The supplemental guard 102 is a mechanical structure. The supplemental guard 102 attaches to the line trimmer 101. The supplemental guard 102 is an adjustable device. Specifically, the supplemental guard 102 rotates relative to the line trimmer 101 such that the supplemental guard 102 will modify the arc of the working range 181 of the cutting line 111 of the line trimmer 101. The supplemental guard 102 comprises a supplemental guard 102 disk 121, a telescopic shaft 122, a plurality of universal joints 123, and a pipe clamp 124.

The supplemental guard 102 disk 121 is a hollow disk structure. The supplemental guard 102 disk 121 has an irregular prism shape. A portion of the perimeter of the supplemental guard 102 disk 121 forms a circular section that follows the radius of a circle. The portion of the supplemental guard 102 disk 121 that forms the circular section is geometrically similar to the circle that forms the primary guard disk 113. The radius of the circle that forms the circular section of the supplemental guard 102 disk 121 is greater than the radius of the circle that forms the primary guard disk 113.

The supplemental guard 102 disk 121 is designed such that the supplemental guard 102 disk 121 slides over the primary guard disk 113 such that the supplemental guard 102 disk 121 rotates around the primary guard disk 113. The supplemental guard 102 disk 121 slides around the primary guard disk 113 such that adjusting the position of the supplemental guard 102 disk 121 relative to the primary guard disk 113 will adjust the arc of the working range 181 of the cutting line 111.

The supplemental guard 102 disk 121 comprises a shell open inferior face 141, a shell closed superior face 142, a shell lateral face 143, and an interior groove 144.

The shell open inferior face 141 is an open face. The shell open inferior face 141 is the face of the disk structure of the supplemental guard 102 disk 121 that is proximal to and overlays the primary open inferior face 131 of the primary guard disk 113.

The shell closed superior face 142 a closed face. The shell closed superior face 142 forms a barrier that prevents the cutting line 111 from moving in the superior direction. The shell closed superior face 142 is the face of the disk structure of the supplemental guard 102 disk 121 that is proximal to and overlays the primary closed superior face 132 of the primary guard disk 113. The shell closed superior face 142 is the face of the supplemental guard 102 disk 121 that is distal from the shell open inferior face 141.

The shell lateral face 143 is the lateral face of the irregular prism disk structure. The shell lateral face 143 is perpendicular to the shell open inferior face 141 and the shell closed superior face 142. The shell lateral face 143 further comprises a first open shell vertical face 151, a second open shell vertical face 152, and a closed shell vertical face 153.

The first open shell vertical face 151 is an open section of the shell lateral face 143. The plane formed by the first open shell vertical face 151 is parallel to the radius of the circle that forms the circular segment formed by the closed shell vertical face 153.

The second open shell vertical face 152 is an open section of the shell lateral face 143. The second open shell vertical face 152 is parallel to the circumference of the circle formed by the closed shell vertical face 153. The planes formed by the first open shell vertical face 151 and the second open shell vertical face 152 form a brink. The second open shell vertical face 152 is the opening in the supplemental guard 102 disk 121 that limits the arc of the working range 181 of the cutting line 111.

The closed shell vertical face 153 forms the solid portion of the shell lateral face 143. The closed shell vertical face 153 forms a barrier that prevents the cutting line 111 from moving beyond the shell lateral face 143 when the cutting line 111 is outside the arc of the working range 181 of the cutting line 111.

Figure 5:
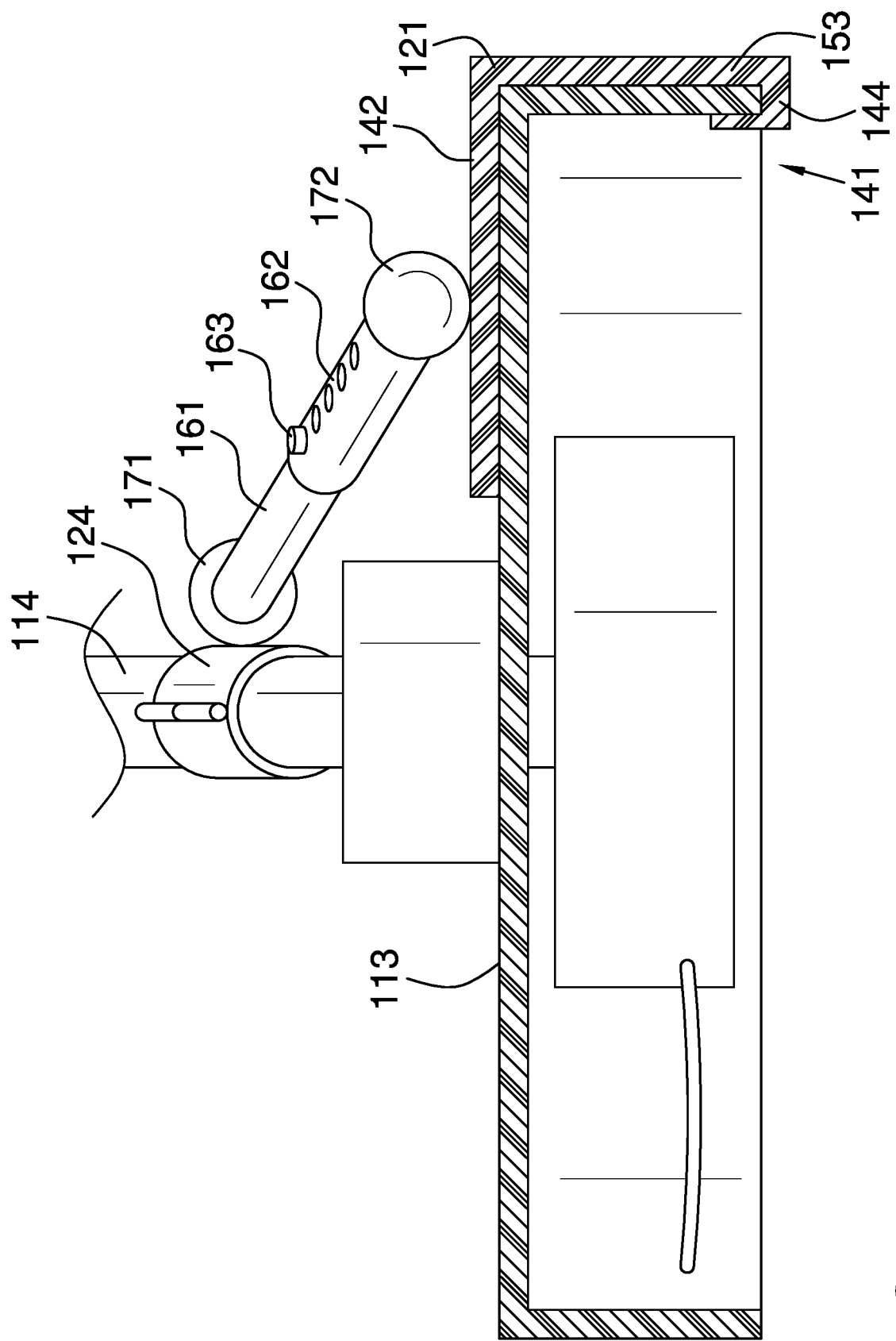
FIG. 5 is a cross-sectional view of an embodiment of the disclosure across 5-5 as shown in FIG. 4.
Figure 6:
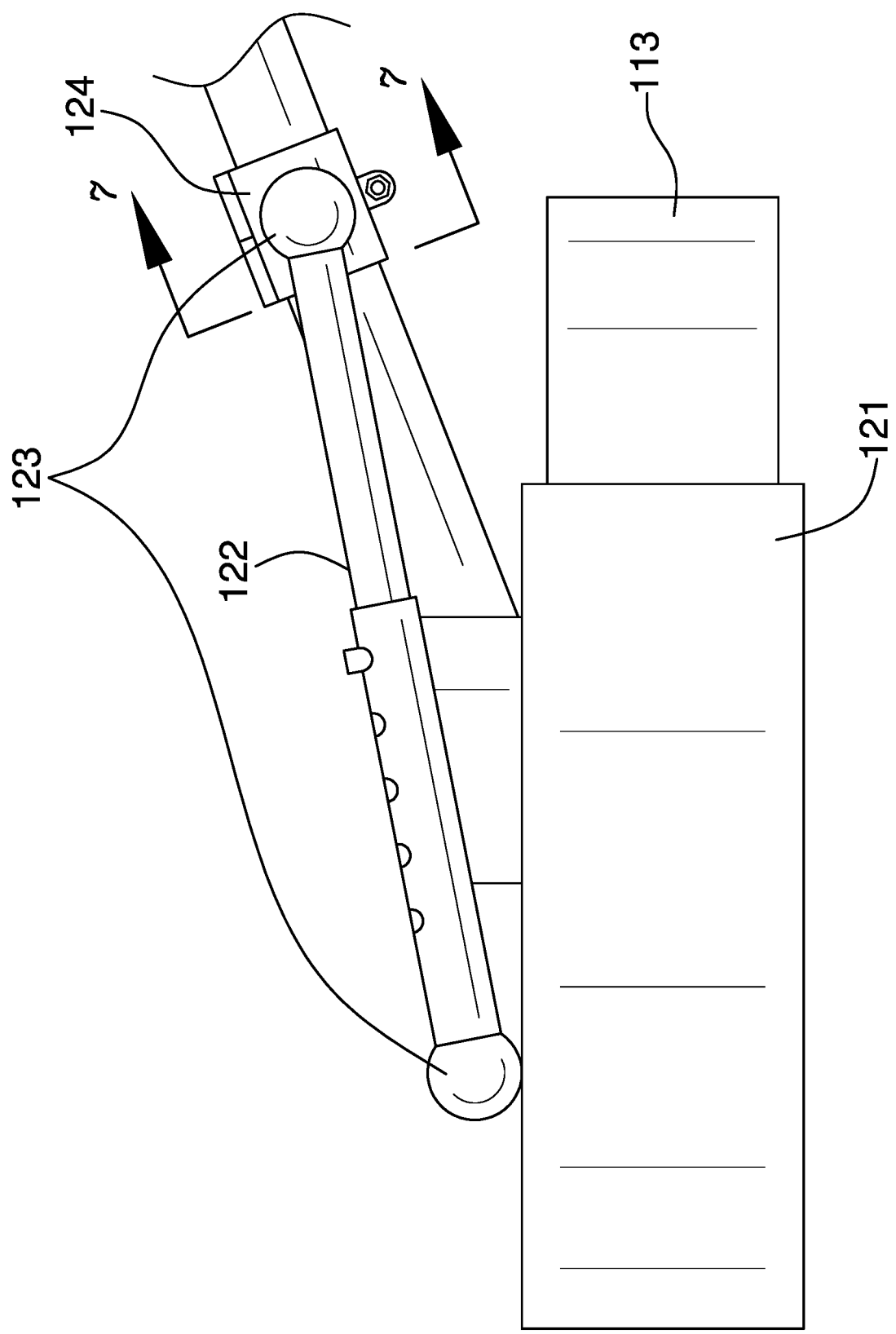
FIG. 6 is a side view of an embodiment of the disclosure.
Figure 7:
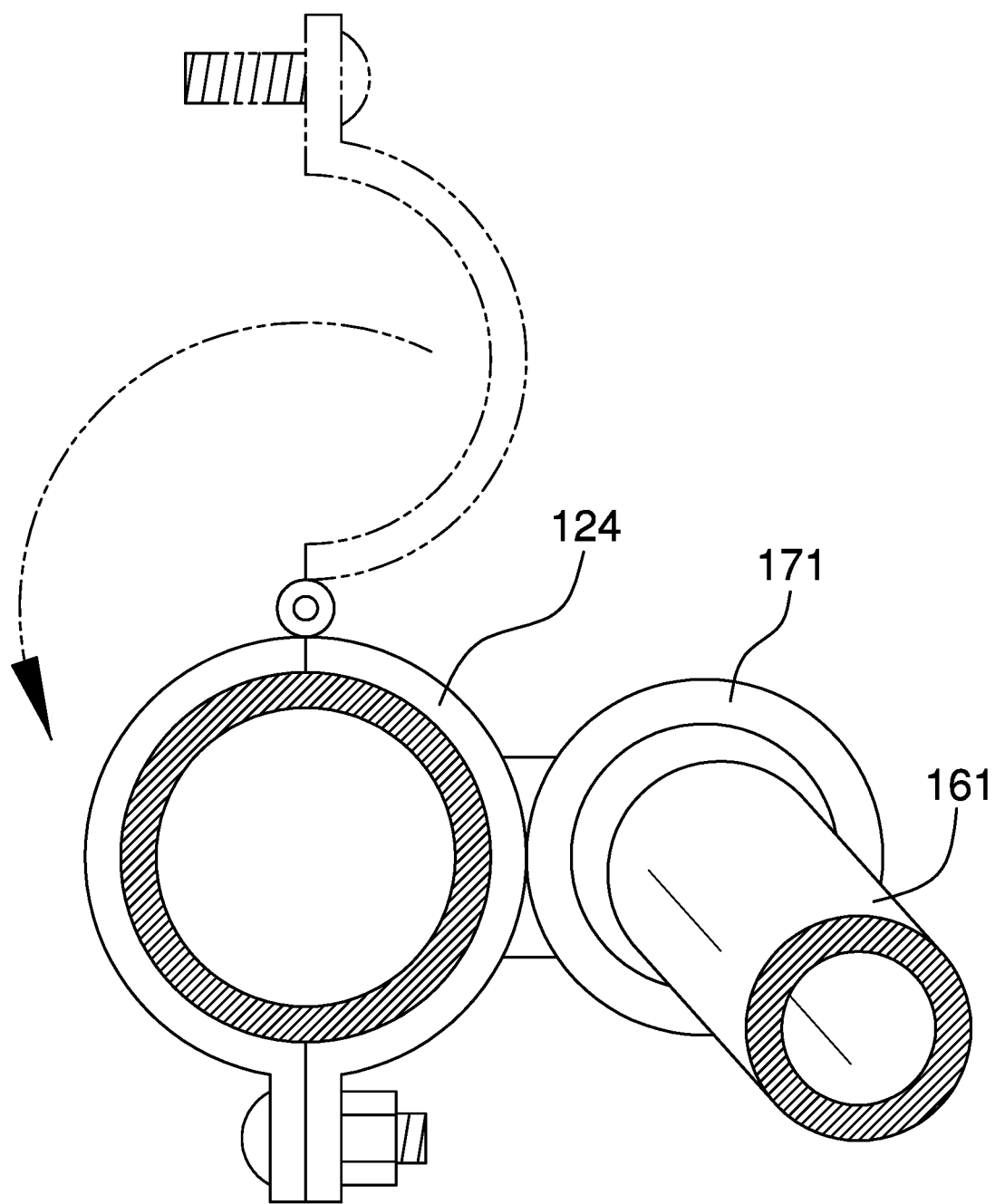
FIG. 7 is a cross-sectional view of an embodiment of the disclosure across 7-7 as shown in FIG. 6.
Figure 8:
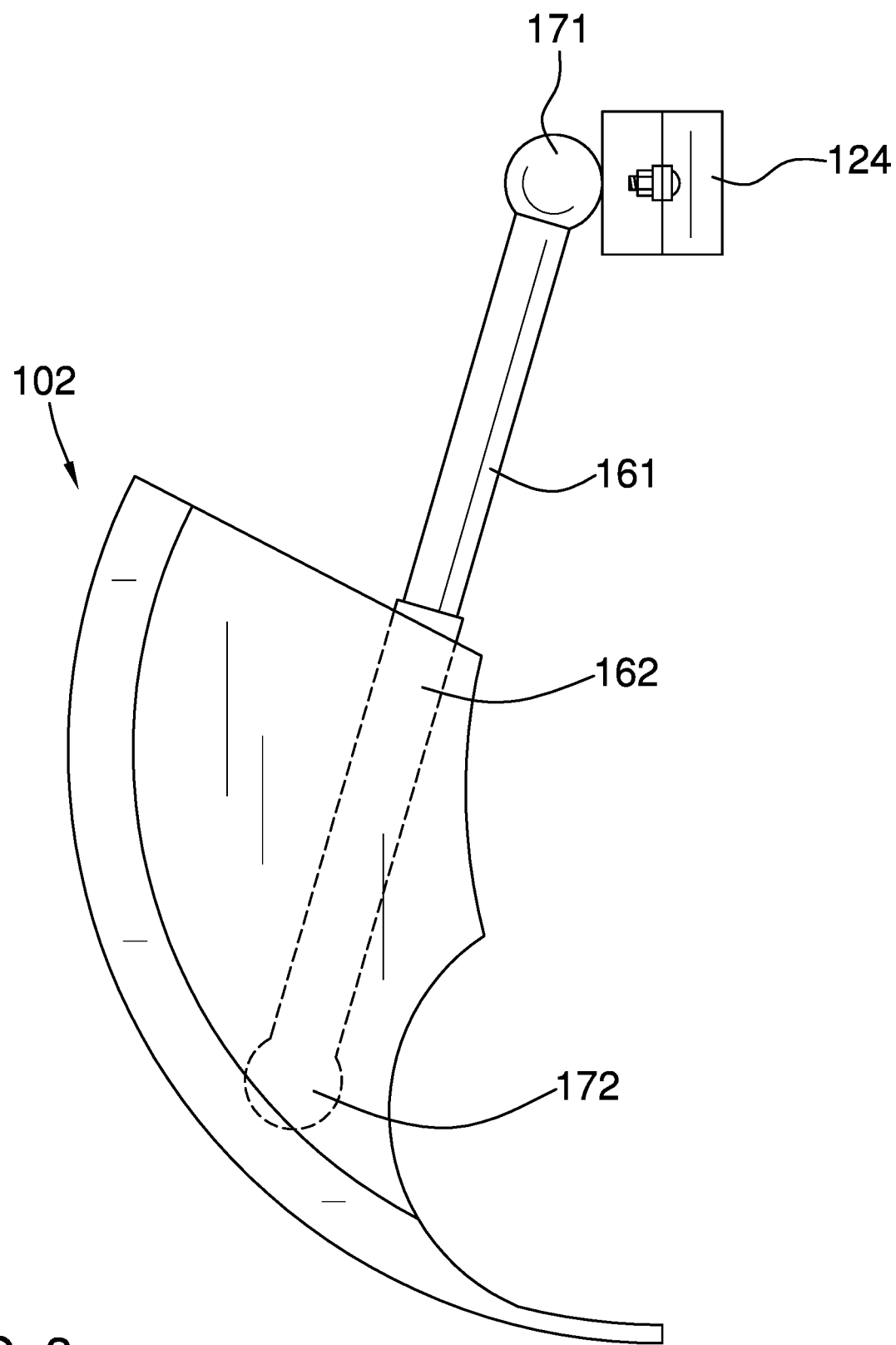
FIG. 8 is a bottom view of an embodiment of the disclosure.
Figure 9:
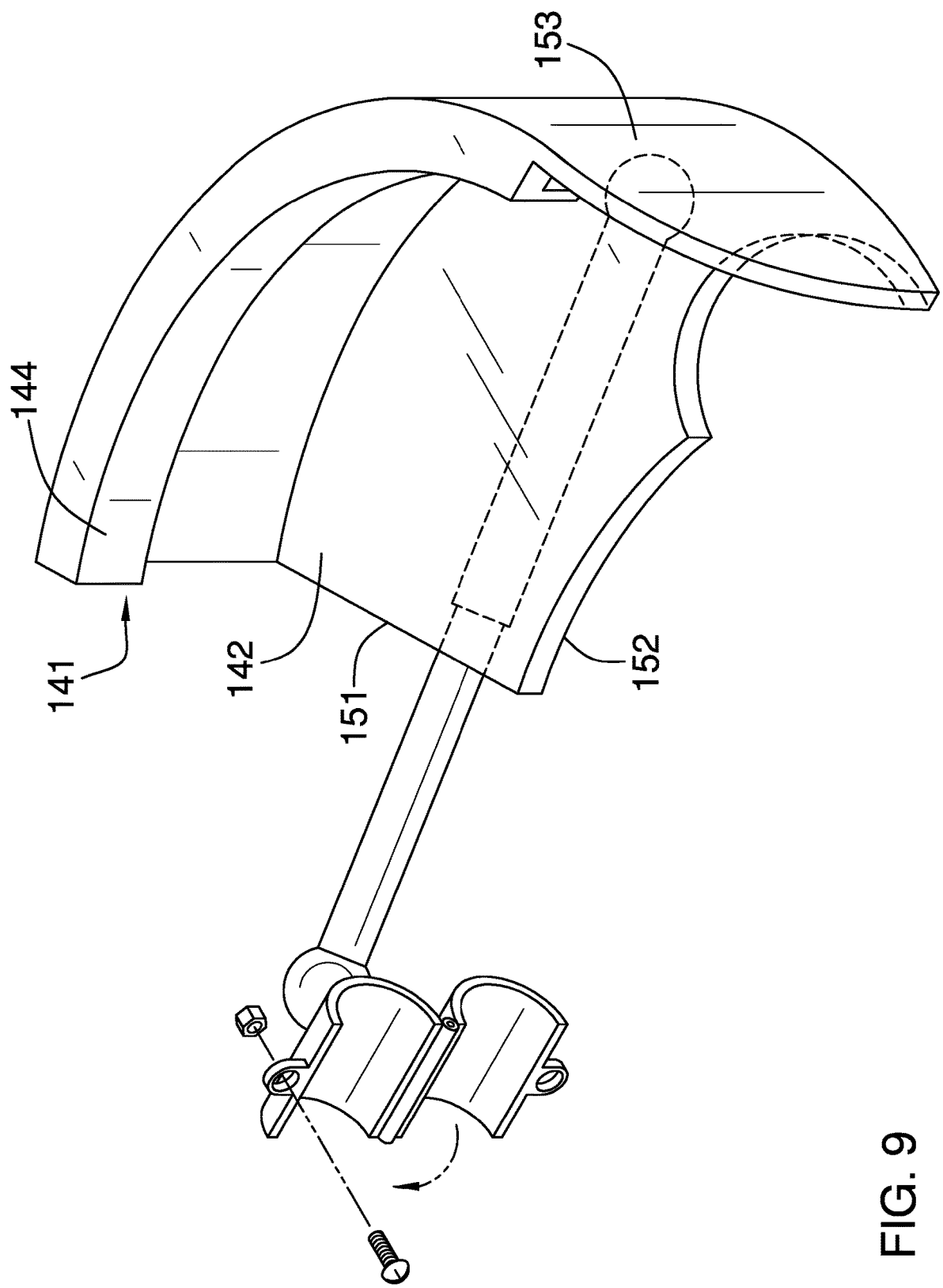
FIG. 9 is a bottom perspective view of an embodiment of the disclosure.

As shown most clearly in FIG. 5, the interior groove 144 is an attachment to the hollow interior surface of the closed shell vertical face 153 of the supplemental guard 102 disk 121. The interior groove 144 forms a track that: a) secures the shell lateral face 143 of the supplemental guard 102 disk 121 to the primary lateral face 133 of the supplemental guard 102 disk 121; and, b) guides the supplemental guard 102 disk 121 around the perimeter of the primary lateral face 133 of the primary guard disk 113.

The span of the length of the radius of the circle that forms the circular segment portion of the shell open inferior face 141 and the shell closed superior face 142 is greater than the span of the length of the radius that forms the semi-circular structure of the primary guard disk 113. The center of the circular elements of the shell open inferior face 141, the shell closed superior face 142, the primary guard disk 113, and the rotating head 112 are vertically aligned.

The span of the vertical distance between the shell open inferior face 141 and the shell closed superior face 142 is greater than the span of the length of the primary lateral face 133 such that the primary guard disk 113 inserts into the supplemental guard 102 disk 121 through the first open shell vertical face 151 of the supplemental guard 102 disk 121. The sizing described above allows the supplemental guard 102 disk 121 to form a sleeve around the primary guard disk 113 that allows the supplemental guard 102 disk 121 to rotate relative to the primary guard disk 113.

The span of the length of the horizontal width of the interior groove 144 is greater than the span of the horizontal width of the closed primary vertical face 135 such that the closed primary vertical face 135 inserts into the interior groove 144.

The telescopic shaft 122 is a shaft structure that attaches the supplemental guard 102 disk 121 to the extension shaft 114 of the cutting line 111. The span of the length of the telescopic shaft 122 is adjustable. The position of the supplemental guard 102 disk 121 relative to the primary guard disk 113 is adjusted by adjusting the span of the length of the telescopic shaft 122.

The telescopic shaft 122 further comprises a first arm 161, a second arm 162 and a detent 163. The detent 163 connects the second arm 162 to the first arm 161. The first arm 161 is a hollow first prism that is further defined with an inner dimension. The second arm 162 is a second prism that is further defined with an outer dimension. The first arm 161 and the second arm 162 are geometrically similar. The outer dimension of the first arm 161 is less than the inner dimension of the second arm 162 such that the first arm 161 can be inserted into the second arm 162 in a telescopic manner. This telescopic arrangement of the telescopic shaft 122 allows the length of the telescopic shaft 122 to be adjusted by adjusting the relative position of the second arm 162 within the first arm 161.

The position of the second arm 162 relative to the first arm 161 is held in position using the detent 163. The detent 163 is a mechanical device that connects and secures the first arm 161 to the second arm 162. The detent 163 is selected from the group consisting of a cotter pin, a G snap collar, a cam lock collar, a threaded clutch, a split collar lock, or a spring-loaded ball lock.

Each of the plurality of universal joints 123 is a commercially available universal joint. Each of the plurality of universal joints 123 attaches the telescopic shaft 122 to a location selected from the group consisting of the extension shaft 114 and the supplemental guard 102 disk 121. Each of the plurality of universal joints 123 rotates when the span of the length of the telescopic shaft 122 is adjusted. In the first potential embodiment of the disclosure, the plurality of universal joints 123 further comprises a first ball and socket joint 171 and a second ball and socket joint 172.

The first ball and socket joint 171 is a universal joint selected from the plurality of universal joints 123. The first ball and socket joint 171 attaches the end of the first arm 161 that is distal from the second arm 162 to the pipe clamp 124. The second ball and socket joint 172 is a universal joint selected from the plurality of universal joints 123. The second ball and socket joint 172 attaches the end of the second arm 162 that is distal from the first arm 161 to the shell closed superior face 142 of the supplemental guard 102 disk 121.

As the position of the supplemental guard 102 disk 121 relative to the primary guard disk 113 adjusts, the span of the length of the telescopic shaft 122 adjusts in compensation. The use of the first ball and socket joint 171 and the second ball and socket joint 172 allows the angle between the center axes of the extension shaft 114 and the telescopic shaft 122 to adjust to changes to the span of the length of the telescopic shaft 122. The use of the first ball and socket joint 171 and the second ball and socket joint 172 allows the angle between the center axes of the extension shaft 114 and the telescopic shaft 122 to adjust to changes in the relative position between the primary guard disk 113 and the supplemental guard 102 disk 121.

The pipe clamp 124 is a commercially available hardware item. The pipe clamp 124 attaches a universal joint selected from the plurality of universal joints 123 to the extension shaft 114. The pipe clamp 124 is a band that wraps around the extension shaft 114. The pipe clamp 124 attaches to the extension shaft 114 using additional commercially available hardware. The selected universal joint attaches to the band of the pipe clamp 124. The pipe clamp 124 removably attaches to the extension shaft 114. By adjusting the position of the pipe clamp 124 relative to the extension shaft 114 the arc of the working range 181 of the cutting line 111 can be further controlled.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Angle of Attack: As used in this disclosure, the angle of attack refers to the angle formed between the direction of a line relative to a reference line or plane.

Arc: As used in this disclosure, an arc refers to a portion of a circumference or a curved perimeter. When applied to an angle, the arc also refers to a measure of an angular span as measured from a circle at the vertex formed by the sides of the angle.

Ball and Socket Joint: As used in this disclosure, a ball and socket joint means a manufactured joint, coupling, or fitting in which a partially spherical object lies in a socket, allowing for multidirectional movement and rotation within limits determined by the construction of the ball and socket joint. The ball and socket joint is a type of universal joint.

Brink: As used in this disclosure, a brink refers to the discontinuous edge or line formed by the intersection of a first plane or surface and a second plane or surface wherein a cant exists between the first plane or surface and the second plane or surface.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Centripetal Force: As used in this disclosure, the term centripetal force is the force that prevents an object undergoing centrifugal action from moving away from the center of the curve, or alternatively that keeps the object moving along a circular path.

Circular Section: As used in this disclosure, a circular section refers to one of the two objects formed by the bifurcation of a circle by a plane that does not pass through the center of the circle. The major section is the circular section that contains the larger area. The minor section is the circular section that contains the smaller area.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Cord: As used in this disclosure, a cord is a long, thin, flexible, and prism-shaped string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, cable, and rope are synonyms for cord.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Extension Structure: As used in this disclosure, an extension structure is an inert physical structure that is used to extend or bridge the reach between any two objects.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Groove: As used in this disclosure, a groove is an open channel or trough used to guide the motion of an object.

Guard: As used in this disclosure, a guard is an inert structure that attaches to a tool such that the guard forms a barrier intended to prevent the tool from causing injury or harm.

Hardware: As used in this disclosure, refers to one or more incidental objects: 1) that are readily and commercially available; and, 2) that are associated with the installation, operation or maintenance of a primary object. Always use incidental.

Incidental: As used in this disclosure, incidental refers to a second object that is associated with a first object but that: 1) does not significantly affect the characteristics of the first object; and, 2) the function of which can be readily replaced by or substituted with a third object.

Inferior: As used in this disclosure, the term inferior refers to a directional reference that is parallel to and in the same direction as the force of gravity when an object is positioned or used normally.

Inner Diameter: As used in this disclosure, the term inner diameter is used in the same way that a plumber would refer to the inner diameter of a pipe.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Overlay: As used in this disclosure, an overlay refers to the placement of a second structure over a first structure such that a portion of the first structure is visible through the second structure.

Outer Diameter: As used in this disclosure, the term outer diameter is used in the same way that a plumber would refer to the outer diameter of a pipe.

Pipe: As used in this disclosure, the term pipe is used to describe a rigid hollow prism. While pipes that are suitable for use in this disclosure are often used to transport or conveys fluids or gases, the purpose of the pipes in this disclosure is structural. In this disclosure, the terms inner dimension of a pipe and outer dimension are used as they would be used by those skilled in the plumbing arts would use inner diameter and outer diameter.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Reach: As used in this disclosure, reach refers to a span of distance between any two objects.

Rotation: As used in this disclosure, rotation refers to the cyclic movement of an object around a fixed point or fixed axis. The verb of rotation is to rotate.

Superior: As used in this disclosure, the term superior refers to a directional reference that is parallel to and in the opposite direction of the force of gravity when an object is positioned or used normally.

Telescopic: As used in this disclosure, telescopic is an adjective that describes an object made of sections that fit or slide into each other such that the object can be made longer or shorter by adjusting the relative positions of the sections.

Tradition: As used in this disclosure, a tradition refers to: 1) a set of thoughts or expectations regarding a subject or object; or, 2) a method of using an object; that, 3) is perceived to be widely or commonly shared across a population of people; and that, 4) is perceived to be widely or commonly shared across at least two generations within the population of people.

Universal Joint: As used in this disclosure, a universal joint is a method of joining a first shaft to a second shaft such that the center axis of the first shaft and is offset from the center axis of the second shaft. The offset angle is adjustable. When a universal joint is formed with a locking mechanism, a universal joint can further be used to lock the offset angle between the first shaft and the second shaft into a fixed position. Universal joints are often used to transfer rotation from the first shaft to rotate the second shaft.

With respect to the above description, it is to be realized that the optimum dimensional relationship for the various components of the invention described above and in FIGS. 1 through 9 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A string trimmer comprising:
    a line trimmer and a supplemental guard;
    wherein the supplemental guard attaches to the line trimmer;
    wherein the line trimmer further comprises a cutting line, a rotating head, a primary guard disk, and an extension shaft;
    wherein the supplemental guard adjusts the arc of the working range of the cutting line of the line trimmer;
    wherein the primary guard disk further comprises a primary open inferior face, a primary closed superior face, and a primary lateral face;
    wherein the primary lateral face further comprises an open primary vertical face and a closed primary vertical face;
    wherein the supplemental guard is a mechanical structure;
    wherein the supplemental guard is an adjustable structure;
    wherein the supplemental guard rotates relative to the line trimmer such that the supplemental guard will modify the arc of the working range of the cutting line of the line trimmer;
    wherein the supplemental guard comprises a supplemental guard disk, a telescopic shaft, a plurality of universal joints, and a pipe clamp;
    wherein one of the plurality of universal joints attaches the telescopic shaft to the supplemental guard disk;
    wherein another of the plurality of universal joints attaches the telescopic shaft to the pipe clamp.

2. The string trimmer according to claim 1
    wherein the supplemental guard disk is a hollow disk structure;
    wherein the supplemental guard disk has an irregular prism shape.

3. The string trimmer according to claim 2
    wherein the telescopic shaft is a shaft structure that attaches the supplemental guard disk to the extension shaft of the line trimmer;
    wherein the span of the length of the telescopic shaft is adjustable;
    wherein the position of the supplemental guard disk relative to the primary guard disk is adjusted by adjusting the span of the length of the telescopic shaft.

4. The string trimmer according to claim 3
    wherein each of the plurality of universal joints attaches the telescopic shaft to a location selected from the group consisting of the extension shaft and the supplemental guard disk;
    wherein each of the plurality of universal joints rotates when the span of the length of the telescopic shaft is adjusted.

5. The string trimmer according to claim 4
    wherein the pipe clamp attaches a universal joint selected from the plurality of universal joints to the extension shaft;
    wherein the pipe clamp removably attaches to the extension shaft.

6. The string trimmer according to claim 5
    wherein a portion of the perimeter of the supplemental guard disk forms a circular section that follows the radius of a circle;
    wherein the portion of the supplemental guard disk that forms the circular section is geometrically similar to the primary guard disk;
    wherein the radius of the circle that forms the circular section of the supplemental guard disk is greater than the radius of the circle that forms the primary guard disk.

7. The string trimmer according to claim 6
    wherein the supplemental guard disk slides over the primary guard disk such that the supplemental guard disk rotates around the primary guard disk;
    wherein the supplemental guard disk rotates around the primary guard disk such that adjusting the position of the supplemental guard disk relative to the primary guard disk will adjust the arc of the working range of the cutting line.

8. The string trimmer according to claim 7
    wherein the supplemental guard disk comprises a shell open inferior face, a shell closed superior face, a shell lateral face, and an interior groove;
    wherein the shell open inferior face is an open face;
    wherein the shell closed superior face is a closed face;
    wherein the shell lateral face is the lateral face of the irregular prism disk structure;
    wherein the shell lateral face is perpendicular to the shell open inferior face and the shell closed superior face;

wherein the interior groove is an attachment to a hollow interior surface of a closed shell vertical face of the supplemental guard disk.

9. The string trimmer according to claim 8
wherein the shell open inferior face overlays the primary open inferior face of the primary guard disk;
wherein the shell closed superior face overlays the primary closed superior face of the primary guard disk.

10. The string trimmer according to claim 9
wherein the shell lateral face further comprises a first open shell vertical face, a second open shell vertical face, and the closed shell vertical face;
wherein the first open shell vertical face is an open section of the shell lateral face;
wherein the second open shell vertical face is an open section of the shell lateral face;
wherein the closed shell vertical face forms the solid portion of the shell lateral face;
wherein the planes formed by the first open shell vertical face and the second open shell vertical face form a brink.

11. The string trimmer according to claim 10
wherein the plane formed by the first open shell vertical face is parallel to the radius of the circle that forms a circular segment formed by the closed shell vertical face;
wherein the second open shell vertical face is parallel to the circumference of the circle formed by the closed shell vertical face;
wherein the second open shell vertical face limits the arc of the working range of the cutting line.

12. The string trimmer according to claim 11
wherein the interior groove forms a track for securing the shell lateral face of the supplemental guard disk to the primary lateral face of the primary guard disk;
wherein the interior groove guides the supplemental guard disk around the perimeter of the primary lateral face of the primary guard disk.

13. The string trimmer according to claim 12
wherein the span of the length of the radius of the circle that forms a circular segment portion of the shell open inferior face and the shell closed superior face is greater than the span of the length of the radius that forms a semi-circular structure of the primary guard disk;
wherein the center of circular elements of the shell open inferior face, the shell closed superior face, the primary guard disk, and the rotating head are vertically aligned;
wherein the span of the vertical distance between the shell open inferior face and the shell closed superior face is greater than the span of the length of the primary lateral face such that the primary guard disk inserts into the supplemental guard disk through the first open shell vertical face of the supplemental guard disk.

14. The string trimmer according to claim 13 wherein the span of the length of the horizontal width of the interior groove is greater than the span of the horizontal width of the closed primary vertical face such that the closed primary vertical face inserts into the interior groove.

15. The string trimmer according to claim 14
wherein the telescopic shaft further comprises a first arm, a second arm, and a detent;
wherein the detent is a mechanical device that connects and secures the first arm to the second arm;
wherein the first arm is a hollow first prism that is further defined with an inner dimension;
wherein the second arm is a second prism that is further defined with an outer dimension;
wherein the first arm and the second arm are geometrically similar;
wherein the outer dimension of the second arm is less than the inner dimension of the first arm such that the second arm can be inserted into the first arm in a telescopic manner;
wherein the span of the length of the telescopic shaft is adjusted by adjusting the relative position of the second arm within the first arm.

16. The string trimmer according to claim 15
wherein the plurality of universal joints further comprises a first ball and socket joint and a second ball and socket joint;
wherein the first ball and socket joint is a universal joint selected from the plurality of universal joints;
wherein the second ball and socket joint is a universal joint selected from the plurality of universal joints.

17. The string trimmer according to claim 16
wherein the first ball and socket joint attaches the end of the first arm that is distal from the second arm to the pipe clamp;
wherein the second ball and socket joint attaches the end of the second arm that is distal from the first arm to the shell closed superior face of the supplemental guard disk.

18. The string trimmer according to claim 17
wherein the shell closed superior face forms a barrier that prevents the cutting line from moving in a superior direction;
wherein the closed shell vertical face forms a barrier that prevents the cutting line from moving beyond the shell lateral face when the cutting line is outside the arc of the working range of the cutting line.

* * * * *